United States Patent
Hashimoto et al.

(10) Patent No.: US 7,302,122 B2
(45) Date of Patent: Nov. 27, 2007

(54) OPTICAL FIBER HOLDING DEVICE, OPTICAL DISPERSION-EQUALIZER, AND METHOD OF MANUFACTURING OPTICAL FIBER HOLDING DEVICE

(75) Inventors: Takashi Hashimoto, Tokyo (JP); Minoru Hashimoto, Tokyo (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 300 days.

(21) Appl. No.: 10/086,363

(22) Filed: Mar. 4, 2002

(65) Prior Publication Data

US 2003/0108268 A1 Jun. 12, 2003

(30) Foreign Application Priority Data

Dec. 10, 2001 (JP) ............................. 2001-376169

(51) Int. Cl.
G02B 6/00 (2006.01)
G02B 6/26 (2006.01)
G02B 6/42 (2006.01)
G02B 6/36 (2006.01)

(52) U.S. Cl. ............................. 385/12; 385/52; 385/91; 385/137

(58) Field of Classification Search ................. 385/12, 385/37, 52, 136, 137, 90, 91
See application file for complete search history.

(56) References Cited

U.S. PATENT DOCUMENTS

| 4,744,627 | A | * | 5/1988 | Chande et al. ............... 385/137 |
| 5,671,307 | A | | 9/1997 | Lauzon et al. |
| 5,671,315 | A | | 9/1997 | Tabuchi et al. |
| 5,692,089 | A | * | 11/1997 | Sellers ........................ 385/137 |
| 5,717,803 | A | | 2/1998 | Yoneda et al. |
| 5,853,626 | A | * | 12/1998 | Kato ............................ 385/89 |
| 5,987,200 | A | * | 11/1999 | Fleming et al. ............... 385/37 |
| 6,168,539 | B1 | * | 1/2001 | Maina ......................... 473/424 |
| 6,217,231 | B1 | * | 4/2001 | Mesaki et al. ................. 385/88 |
| 6,229,827 | B1 | | 5/2001 | Fernald et al. |
| 6,294,232 | B1 | * | 9/2001 | Yamauchi .................... 385/88 |
| 6,411,746 | B1 | | 6/2002 | Chamberlain et al. |

(Continued)

FOREIGN PATENT DOCUMENTS

EP 0 977 061 A2 * 2/2000

(Continued)

OTHER PUBLICATIONS

"Thermal Compounds, Adhesives, Interface Materials, Hardware, Installation Tools", http://www.industrialelectronics.biz/wakefld/wakep182.html, pp. 1-3, copyright 1998 no month available.*

*Primary Examiner*—Jared J. Fureman
(74) *Attorney, Agent, or Firm*—Buchanan Ingersoll & Rooney PC

(57) ABSTRACT

There is disclosed an optical fiber holding device comprising an optical fiber 1 with a grating 2 for reflecting a propagated optical signal of a number of wavelengths, a heater 3 for heating the grating 2 to a predetermined temperature distribution, a strip-shaped member 6 having a rectilinear groove in which the optical fiber 1 is accommodated, and the gel substance 7 contacting with the optical fiber 1 is filled, and a substrate 4 on which the heater 3 and the strip-shaped member 6 are mounted.

14 Claims, 11 Drawing Sheets

U.S. PATENT DOCUMENTS

| | | |
|---|---|---|
| 6,461,059 B2 | 10/2002 | Ando et al. |
| 6,477,309 B2 * | 11/2002 | So .............................. 385/137 |
| 6,553,173 B1 * | 4/2003 | Goto ........................... 385/137 |
| 6,594,426 B1 * | 7/2003 | Kwon et al. ................... 385/52 |
| 6,643,430 B2 * | 11/2003 | Matsumoto et al. ........... 385/37 |
| 2001/0026665 A1 | 10/2001 | Ando et al. |
| 2002/0037141 A1 * | 3/2002 | Miyamoto et al. ........... 385/137 |
| 2002/0048430 A1 * | 4/2002 | Hashimoto et al. ........... 385/37 |
| 2002/0057884 A1 * | 5/2002 | Hirose et al. ................ 385/137 |
| 2002/0097974 A1 * | 7/2002 | Matsumoto et al. ........ 385/137 |
| 2002/0106157 A1 * | 8/2002 | Hu et al. ....................... 385/37 |
| 2002/0181880 A1 * | 12/2002 | Dautartas et al. ........... 385/137 |
| 2002/0186954 A1 * | 12/2002 | Liu et al. .................... 385/137 |
| 2003/0081926 A1 * | 5/2003 | Jeong et al. ................. 385/137 |
| 2003/0123797 A1 * | 7/2003 | Hashimoto et al. ........... 385/37 |
| 2003/0123800 A1 * | 7/2003 | Hashimoto et al. ........... 385/37 |
| 2003/0133656 A1 * | 7/2003 | Baldwin et al. ............... 385/37 |

FOREIGN PATENT DOCUMENTS

| | | | |
|---|---|---|---|
| JP | 63-56616 A | * | 3/1988 |
| JP | 3-134603 A | * | 6/1991 |
| JP | 08-292383 | | 11/1996 |
| JP | 2000-009949 | | 1/2000 |
| JP | 2000-028934 | | 1/2000 |
| JP | 2000-180677 | | 6/2000 |
| JP | 2000-206347 | | 7/2000 |
| JP | 2000-252920 | | 9/2000 |
| JP | 2001-77756 | | 3/2001 |
| WO | WO 99/19755 | | 2/1999 |
| WO | WO 01/53880 | | 7/2001 |

* cited by examiner

FIG.1
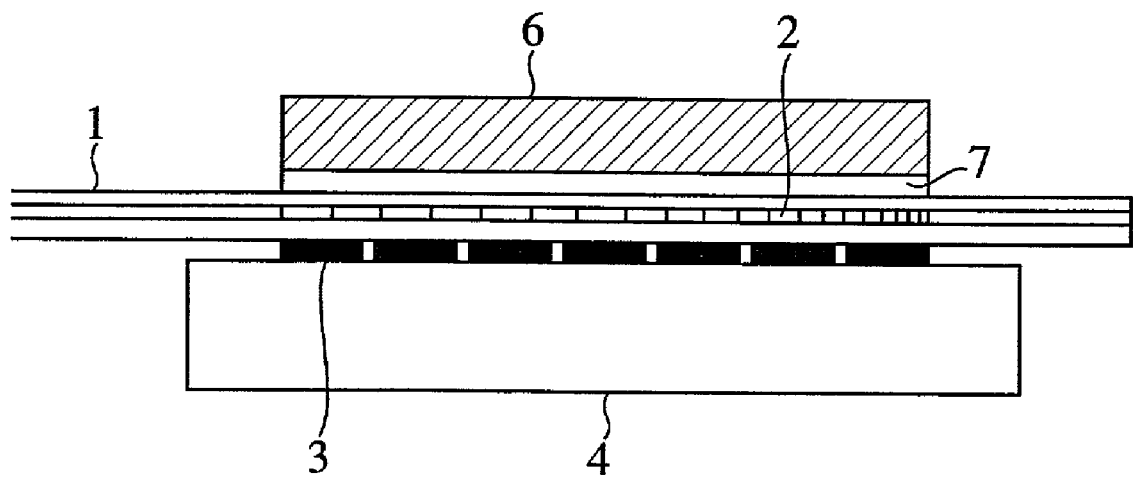
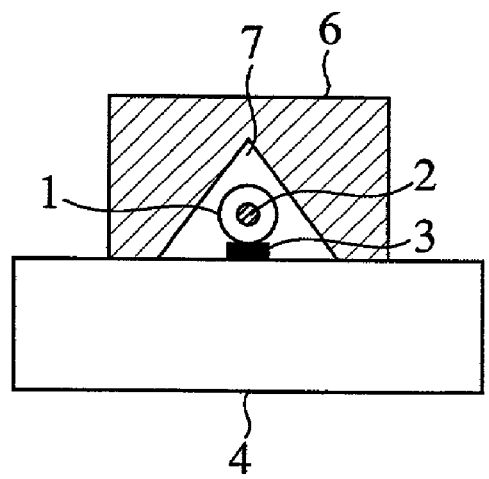

FIG.6

| FILLERS | TYPES | CURING CONDITIONS | HARDNESS | FEATURES |
|---|---|---|---|---|
| SILICON | ADHESIVE | 150°C 1 HOUR | JIS A 28 | SOFT, HEAT-RESISTANCE, HIGH-ADHESIVENESS |
| | PASTE | NORMAL TEMPERATURE NON-CURING | — | FILLER UNRELIABLE AS SOLVENT IS VOLATILE AFTER COATING |
| | GEL SUBSTANCE | 150°C 1 HOUR | PENETRATION 85 | CONTACT-TYPE SUPER SOFT, HEAT-RESISTANCE |
| EPOXY | ULTRAVIOLET CURING-TYPE ADHESIVE (CONTAINING FILLER) | ULTRAVIOLET IRRADIATION FOR 1 MINUTE | JIS D 90 | SHORT CURING TIME STABILIZE MEMBERS WITH FILLER TG 160°C OR MORE, SMALL CURING SHRINKAGE |
| | ULTRAVIOLET CURING-TYPE ADHESIVE (NOT CONTAINING FILLER) | ULTRAVIOLET IRRADIATION FOR 1 MINUTE | JIS D 90 | SHORT CURING TIME TG 160°C OR MORE, SMALL CURING SHRINKAGE |
| | TWO-PART HEAT CURING-TYPE ADHESIVE | 70°C 1 HOUR | | LOW HEAT-RESISTANCE |

FIG.8

| PMD MEASUREMENT CONDITIONS | |
|---|---|
| WAVE RANGE | 1548nm ~1550nm |
| MODULATION FREQUENCY | 500MHz |
| DISPERSION AMOUNT OF GRATING | -250ps/nm |
| PMD MEAN VALUE | PMD MEAN VALUE WITHIN TRANSMISSION BAND |

FIG.9

| FILLER | | | |
|---|---|---|---|
| FILLERS | TYPES | PMD(ps) MEAN VALUE | |
| | | BEFORE CURING | AFTER CURING |
| SILICON | ADHESIVE | 1.7 | 3.7 |
| | PASTE | 1.2 | 5.3 |
| | GEL SUBSTANCE | 1.2 | 1.2 |
| EPOXY | ULTRAVIOLET CURING-TYPE ADHESIVE (CONTAINING FILLER) | 2.8 | 5.1 |
| | ULTRAVIOLET CURING-TYPE ADHESIVE (NOT CONTAINING FILLER) | 5.3 | 2.8 |
| | TWO-PART HEAT CURING-TYPE ADHESIVE | 4.8 | 0.9 |

OPTICAL FIBER HOLDING DEVICE, OPTICAL DISPERSION-EQUALIZER, AND METHOD OF MANUFACTURING OPTICAL FIBER HOLDING DEVICE

BACKGROUND OF THE INVENTION

1. Field of the Invention

This invention relates to an optical fiber holding for holding an optical fiber for an optical fiber communication system, an optical dispersion-equalizer for compensating wavelength dispersion of a number of optical signals propagating through the optical fiber, and a method of manufacturing the optical fiber holding device.

2. Description of Related Art

FIG. 14 is a structural drawing of a conventional optical fiber holding device.

Referring to FIG. 14, reference numeral 1 denotes an optical fiber made of a core and a clad; 2 a grating which is formed at a part of the core of the optical fiber and reflects an optical signal of a number of wave lengths; 3 heaters which are made of a thin film for heating the grating to a predetermined temperature distribution; and 4 a substrate which is, for instance, made of quartz and on which the heater 2 is mounted. Furthermore, the grating 2 is used for compensating the wavelength dispersion of a number of optical signals propagated through the optical fiber 1.

As shown in FIG. 14, the optical fiber 1 is directly mounted on the heater 3 which is made of the thin film. Therefore, in order to heat the grating 2 to the predetermined temperature distribution, it is necessary to carry out an accurate positioning of the grating 2 in the longitudinal and the transverse directions, and to mount it on the heater 3. The positioning of the grating 2 with respect to the heater 3 in the longitudinal direction should be made such that a positioning marker (not shown) for the grating 2 provided on the surface of the optical fiber at the both ends of the grating 2 is aligned with the both ends of the heater 3. Similarly, the positioning of the grating 2 with respect to the heater 3 in the transverse direction should be made such that the center of the heater 3 is put on an axial center of the grating 2 in the longitudinal direction.

The positioning of the grating 2 with respect to the heater 3 in the longitudinal and the transverse directions is made on a microscope, while conforming the position of the grating 2, with a tension added to the optical fiber 1. However, since the diameter of the optical fiber is 125 μm or so (60 μm, for instance), accurate positioning and mounting of the grating 2 on the heater 3 is difficult and takes a lot of time What is worse, the both ends of the optical fiber 1 of the grating 2 are only secured after the position, and any fixations are not had to the grating 2. Therefore, there can be a possibility that dislocation of the grating 2 with respect to the heater 3 would be occurred.

FIG. 15 is a structural drawing of another conventional optical fiber holding device.

Referring to FIG. 15, reference numeral 5 denotes an adhesive for securing the optical fiber 1 having a grating 2 to the substrate 4. The other structure other than the adhesive 5 is the same as that in FIG. 14. As shown in FIG. 15, the grating 2 of the optical fiber 1 is mounted on the heater 3 in the same manner as the optical fiber holding device in FIG. 14. Then, an adhesive is coated on the heater 3 so as to secure the optical fiber 1 to the substrate 4. Here, adhesive paste or resin may be used instead of the adhesive 5.

In this case, when the adhesive 5 is coated, the grating 2 displaces due to viscosity of the adhesive 5, leading to displacement of the grating with respect to the heater 3. On the other hand, when the adhesive 5 is cured, the grating 2 also displaces due to the volume change caused by curing of the adhesive 5, resulting in displacement of the grating 2 with respect to the heater 3. At that moment, a stress resulting from the volume change when the adhesive 5 is cured is applied to the optical fiber 1, which deforms a shape of the core and occurs a double reflection, with the result that a polarization mode dispersion characteristic will be degraded.

The polarization mode dispersion (PMD) will be briefly described.

Generally, an optical signal in a single mode optical fiber is present as a propagation mode including two orthogonal polarization modes. But, the two orthogonal polarization modes undergo a change in their characteristics by any disturbances and thus the normal propagation mode suffers from degradation by the double reflection. It is called as a polarization mode dispersion. As a result of the disturbances, the double reflection is occurred. Typical disturbances are listed, i.e., heterogeneity of the core shape, heterogeneity of compositions in the core, deformation of the core shape due to a stress application, and heterogeneity of temperature in the core.

Such a conventional optical fiber holding device as shown in FIG. 14 gives rise to difficulties in accurately positioning the grating 2 on the heater 3 and may cause dislocation of the grating 2 with respect to the heater 3, even through the grating 2 has already mounted on the heater 3.

Further, in the optical fiber holding device shown in FIG. 15, when the adhesive 5 is coated, viscosity of the adhesive 5 causes dislocation of the grating 2 with respect to the heater 3 and, when the adhesive 5 is cured, the volume change due to curing causes the same.

Moreover, in the optical fiber holding device shown in FIG. 15, the stress resulting from the volume change when the adhesive 5 is cured is applied to the optical fiber 1, suffering from degradation of the polarization mode dispersion characteristic.

SUMMARY OF THE INVENTION

The present invention has been made to solve the above problems and an object thereof is to provide an optical fiber holding device, an optical dispersion-equalizer, and a method of manufacturing an optical fiber holding device, which facilitates positioning of the grating 2 with respect to the heater 2 when the optical fiber 1 is mounted, obviates dislocation of the grating 2 with respect to the heater 2 after the optical fiber has mounted, and prevents the polarization mode dispersion characteristic from being degraded.

There have been known two related publications.

(1) Japanese Patent Application Number 2000-206347. This publication disclosed "An optical device with optical fiber reflection lattices", which holds a temperature compensating device for temperature compensating an optical fiber in which reflection lattices are provided and an optical device with two substrates on which V-shaped grooves are formed.

(2) U.S. Pat. No. 5,671,307. This publication disclosed "USE OF A TEMPERATURE GRADIENT TO IMPOSE A CHIP ON A FIBER BRAGG GRATING", which puts an optical fiber in a bronze plate on which V-shaped grooves are formed, fills a thermal compound into a gap between the V-shaped grooves and the optical fiber, and encloses the both sides of the bronze plate with Peltier device for thermal control.

However, arts disclosed in the above publications are able to hold the optical fiber at the predetermined position, but unable to prevent from the degradation of the polarization mode dispersion due to a stress applied to the optical fiber.

According to one aspect of the invention, there is provided an optical fiber holding device, comprising an optical fiber; a strip-shaped member, having a rectilinear groove in which the optical fiber is accommodated, and a gel substance contacting with the optical fiber is filled; and a substrate on which the optical fiber and the strip-shaped member are mounted.

In the optical fiber holding device, the optical fiber is not contacted with a wall surface of the groove of the strip-shaped member.

According to another aspect of an optical fiber holding device, comprising an optical fiber having a grating; a heater for heating the grating to a predetermined temperature distribution; a strip-shaped member, having a rectilinear groove in which the optical fiber is accommodated, and a gel Substance contacting with the optical fiber is filled; and a substrate on which the heater and the strip-shaped member are mounted.

In the optical fiber holding device, the optical fiber is not contacted with a wall surface of the groove of the strip-shaped member.

In the optical fiber holding device, the optical fiber is contacted with the heater.

In the optical fiber holding device, further comprising a Peltier element for keeping temperature level of the predetermined temperature distribution of the grating at a predetermined level; and a temperature sensor for detecting the temperature of the optical fiber used to control the Peltier element.

In the optical fiber holding device, a positioning mark is provided on the substrate, which is used for positioning the strip-shaped member on the substrate.

In the optical fiber holding device, the gel substance includes a silicon compound.

In the optical fiber holding device, the strip-shaped member is made of quartz.

According to still another aspect of the invention, there is provided an optical dispersion-equalizer, comprising an optical fiber having a grating; a heater for heating the grating to a predetermined temperature distribution; a heater control circuit for controlling a temperature of the heater; a strip-shaped member, having a rectilinear groove in which the optical fiber is accommodated, and a gel substance contacting with the optical fiber is filled; a substrate on which the heater and the strip-shaped member are mounted; a Peltier element for keeping temperature level of the predetermined temperature distribution of the grating at a predetermined level; a temperature sensor for detecting the temperature of the optical fiber; a Peltier element control circuit for controlling the peltier element based on the temperature of the optical fiber detected by the temperature sensor; and an optical circuitry for inputting an optical signal to the grating and for outputting the optical signal reflected on the grating.

According to still another aspect of the invention, there is provided a method of manufacturing an optical fiber holding device comprising an optical fiber having a grating; a heater for heating the grating to a predetermined temperature distribution; a strip-shaped member, having a rectilinear groove in which the optical fiber is accommodated, and a gel substance contacting with the optical fiber is filled; and a substrate on which the heater and the strip-shaped member are mounted, the method comprising the steps of filling the gel substance in the groove of the strip-shaped member; accommodating the optical fiber in the groove of the strip-shaped member in which the gel substance is filled; mounting the strip-shaped member, in which the gel substance is filled and the optical fiber is accommodated, on the substrate on which the heater is mounted; and moving the strip-shaped member on the substrate so as to carry out a positioning of the groove with respect to the heater.

According to yet another aspect of the invention, there is provided a method of manufacturing an optical fiber holding device comprising an optical fiber having a grating; a heater for heating the grating to a predetermined temperature distribution; a strip-shaped member, having a rectilinear groove in which the optical fiber is accommodated, and a gel substance contacting with the optical fiber is filled; and a substrate on which the heater and the strip-shaped member are mounted; the method comprising the steps of securing the strip-shaped member on the substrate on which the heater is mounted; filling the gel substance in the groove of the strip-shaped member secured on the substrate; inserting and accommodating the optical fiber in the groove of the strip-shaped member in which the gel substance is filled; and moving the optical fiber on the heater so as to carry out a positioning of the grating with respect to the heater.

According to yet another aspect of the invention, there is provided a method of manufacturing an optical fiber holding device comprising an optical fiber having a grating; a heater for heating the grating to a predetermined temperature distribution; a strip-shaped member, having a rectilinear groove in which the optical fiber is accommodated, and a gel substance is filled; and a substrate on which the heater and the strip-shaped member are mounted, the method comprising the steps of mounting the optical fiber on the heater which is mounted on the substrate; coating the optical fiber mounted on the heater with a gel substance; mounting the striP-shaped member on the substrate and accommodating the optical fiber in the groove of the strip-shaped member; and moving the strip-shaped member on the substrate so as to carry out a positioning of the grating with respect to the heater.

The above and other objects and the attendant advantages of the invention will become readily apparent by referring to the following detailed description of the preferred embodiments when considered in conjunction with the accompanying drawings.

BRIEF DESCRIPTION OF THE DRAWINGS

FIG. 1 is a structural drawing of an optical fiber holding device according to a first embodiment.

FIG, 3B is an example of the dimension of a groove of a strip-shaped member in rectangular.

Figure 4:
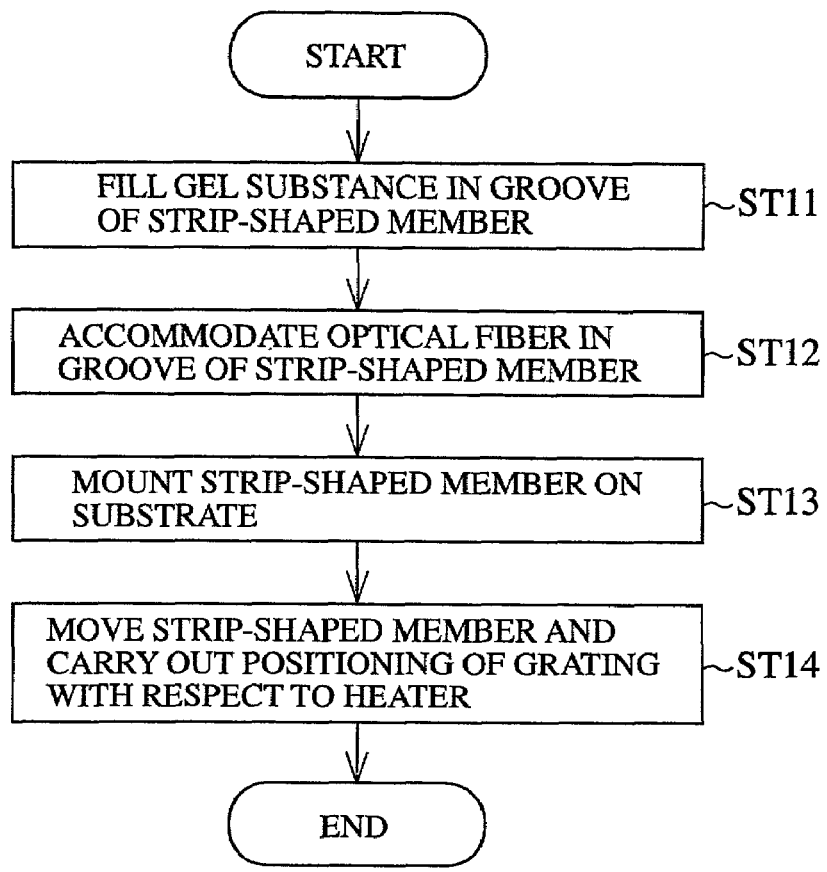

FIG. 4 is a flow chart showing assembly procedures of an optical fiber holding device according to a first embodiment.

Figure 5:
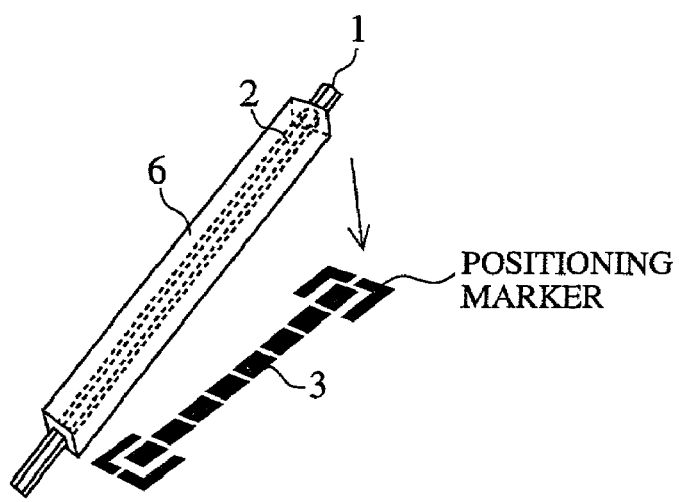

FIG. 5 is an explanatory drawing of a state of mounting a strip-shaped member on the substrate.

FIG. 6 is a chart showing sorts and features of the fillers used for comparing the polarization mode dispersion characteristic.

Figure 7:
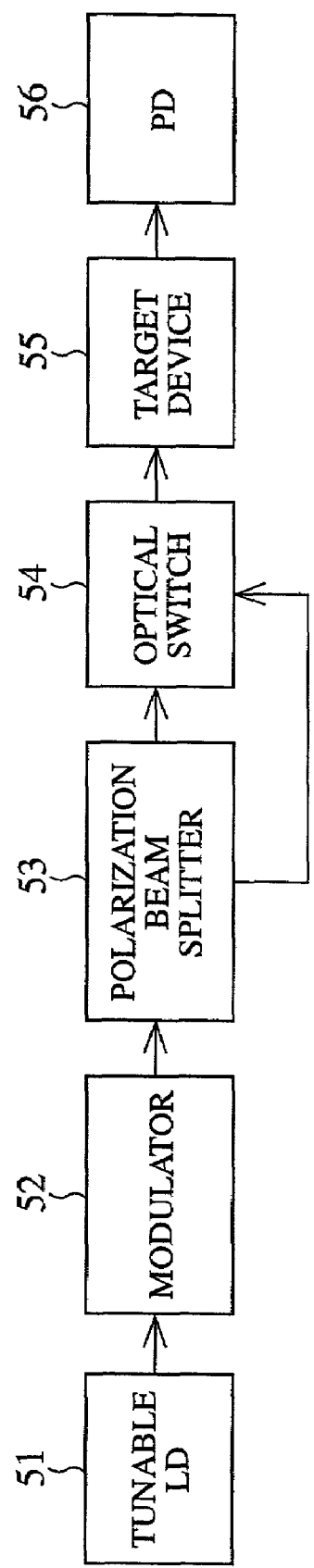

FIG. 7 is a block diagram showing a method of measuring the polarization mode dispersion.

FIG. 8 is a chart showing measuring conditions of the polarization mode dispersion.

FIG. 9 is a chart showing results of the PMD mean value of the respective fillers before and after curing.

Figure 10:
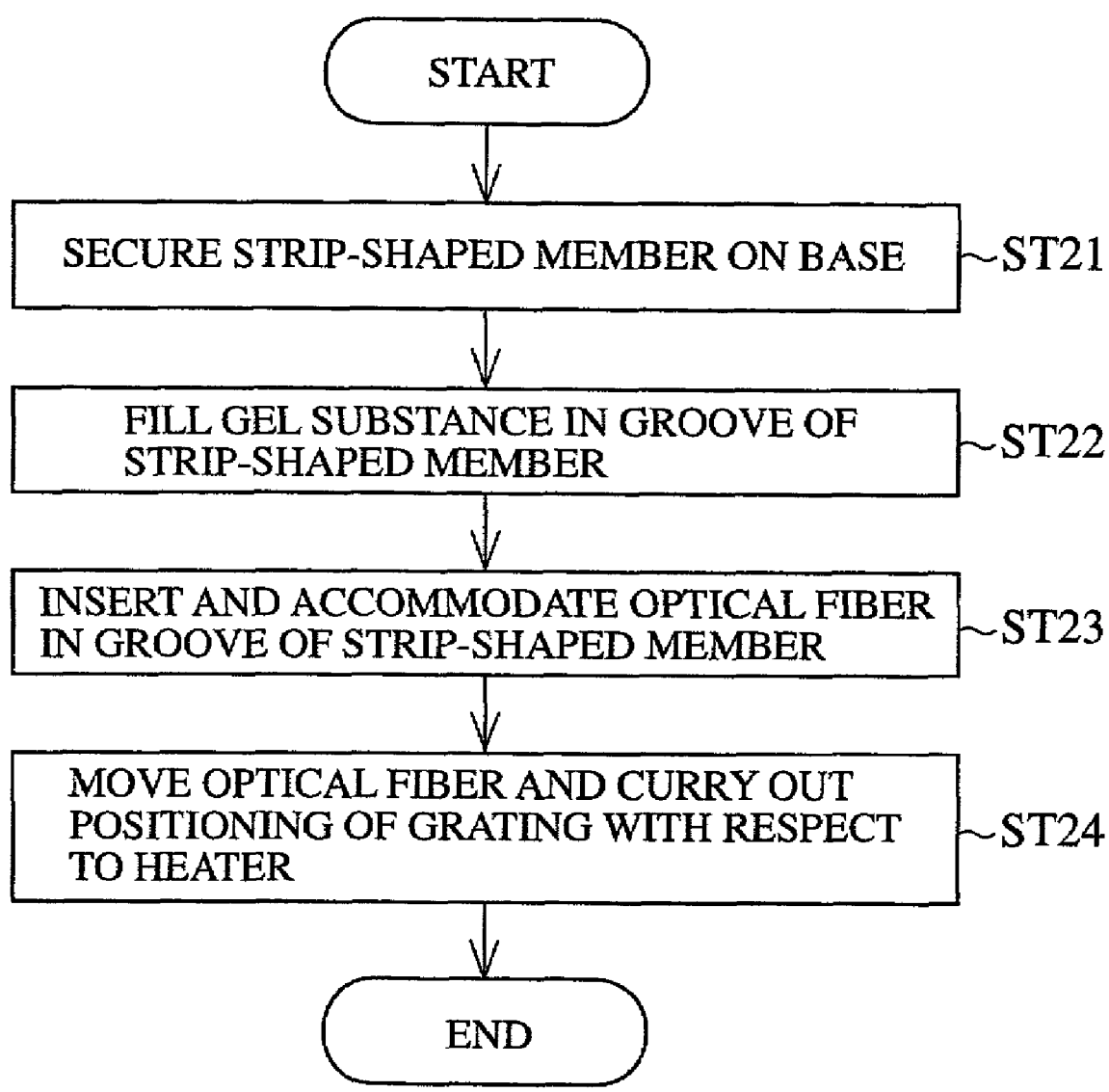

FIG. 10 is a flow chart showing assembly procedures of an optical fiber holding device according to a second embodiment.

Figure 11:
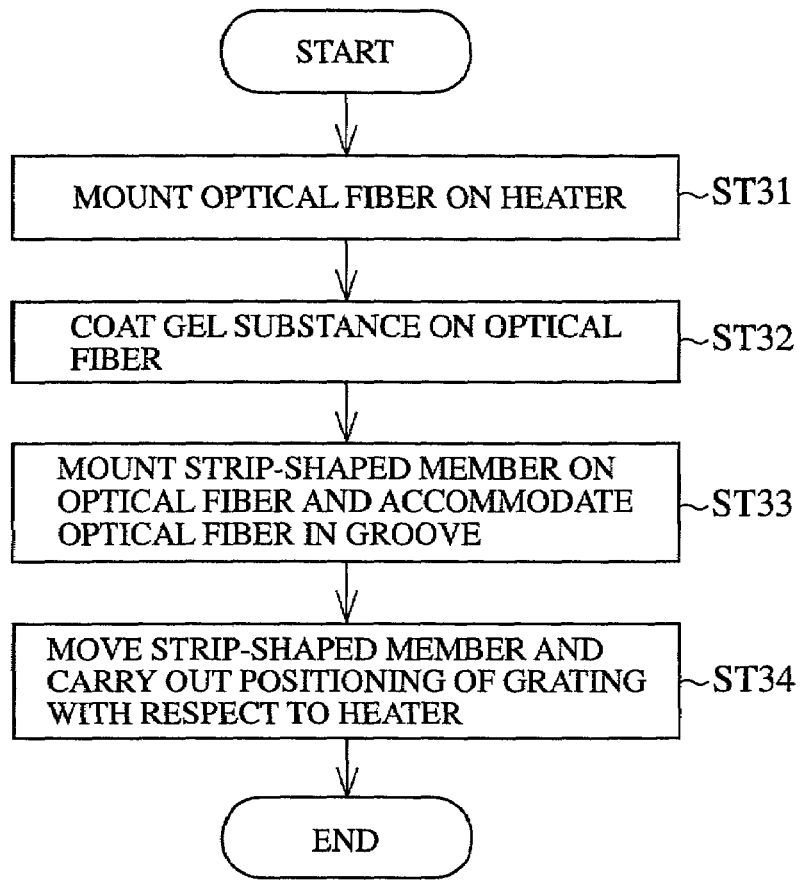

FIG. 11 is a flow chart showing assembly procedures of an optical fiber holding device according to a third embodiment.

Figure 12A:
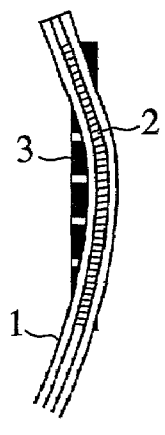

FIG. 12A shows a state in which dislocation of the grating with respect to the heater is occurred.

Figure 12B:
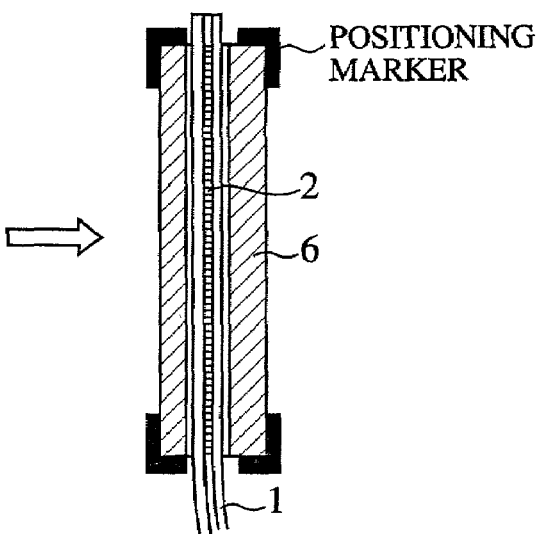

FIG. 12B is an explanatory drawing of assembly procedures of an optical fiber holding device.

Figure 13:
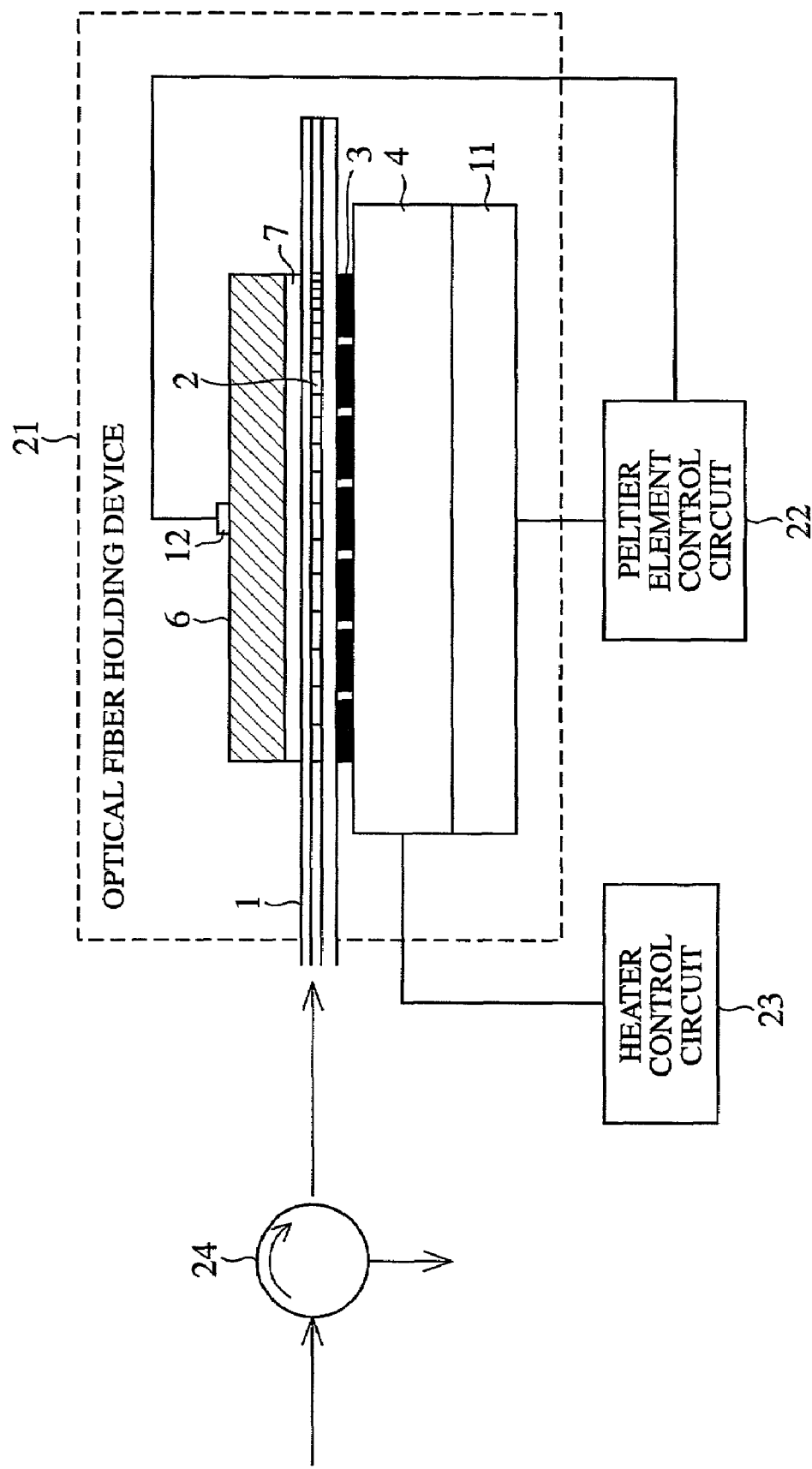

FIG. 13 is a structural drawing of the optical dispersion-equalizer according to a fourth embodiment.

Figure 14:
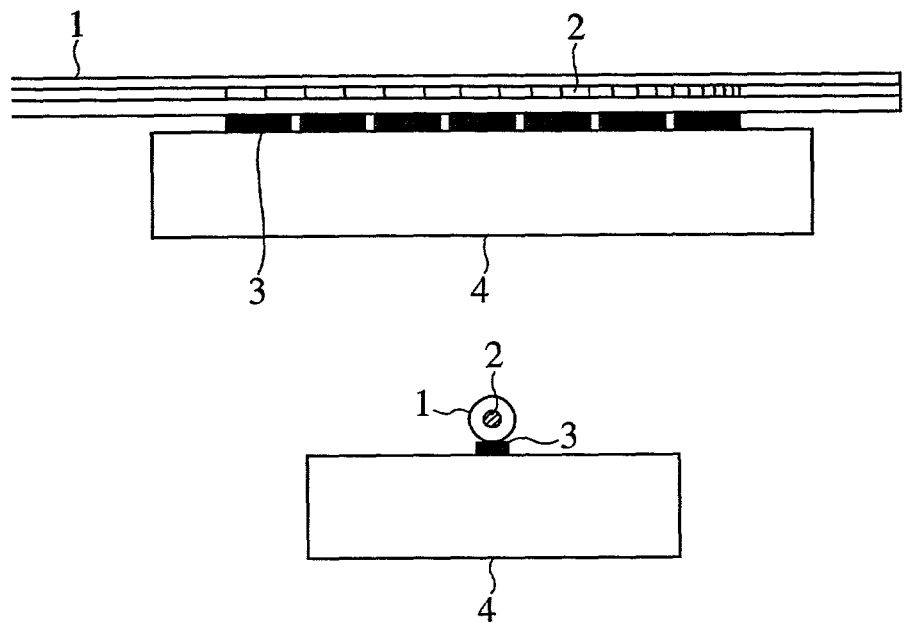

FIG. 14 is a structural drawing of a conventional optical fiber holding device.

Figure 15:
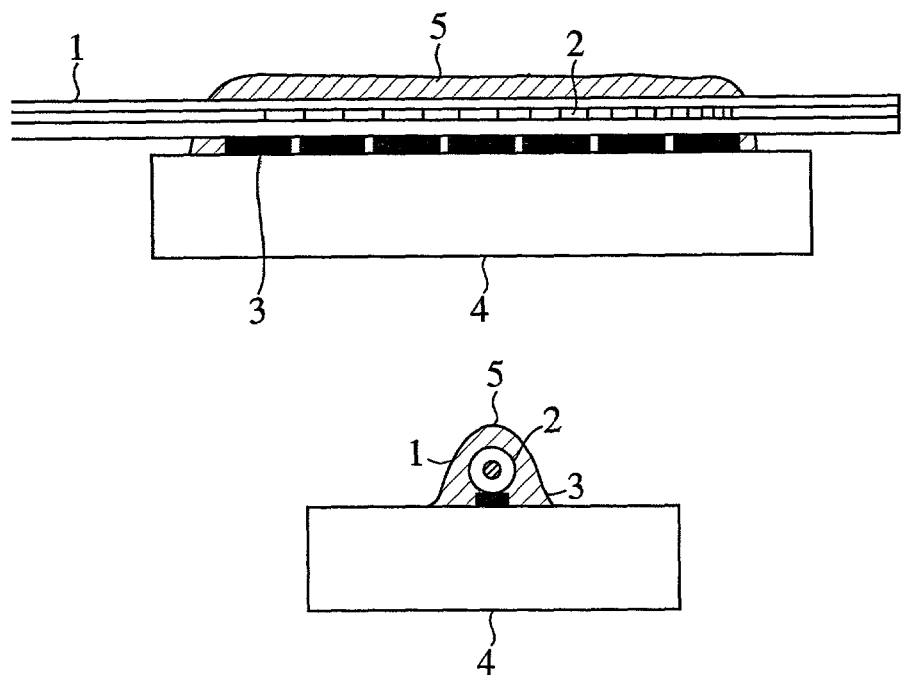

FIG. 15 is a structural drawing of another conventional optical fiber holding device.

Throughout the figures, the same reference numerals, and characters, unless otherwise noted, are used to denote like features, elements, components, or portions of the illustrated embodiment.

DETAILED DESCRIPTION OF THE PREFERRED EMBODIMENTS

The preferred embodiments of the present invention will be described in detail, referring to the accompanying drawings.

First Embodiment

FIG. 1 is a structural drawing of an optical fiber holding device according to a first embodiment.

Referring to FIG. 1, reference numeral 6 denotes a strip-shaped member having a rectilinear V-shaped groove for accommodating therein an optical fiber 1; and 7 a gel substance as a filler filled in the V-shaped groove of the strip-shaped member. The other substance other than the above is the same as that shown in FIG. 14, and so the same reference numerals are used and descriptions thereof will be omitted for brevity sake.

As shown in FIG. 1, a gap is formed between the optical fiber I and a wall surface of the groove of the strip-shaped member 6 such that the optical fiber 1 is not contacted with the wall surface of the groove of the strip-shaped groove 6 in which the gel substance 7 is filled.

Figure 2A:
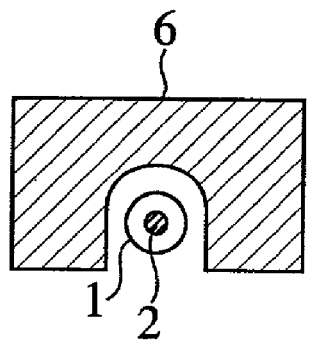
FIG. 2A is a variation of the strip-shaped member in which a groove is formed in U-shape.
Figure 2B:
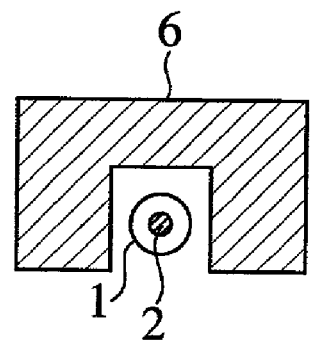
FIG. 2B is a variation of the strip-shaped member in which a groove is formed in rectangular.
Figure 2C:
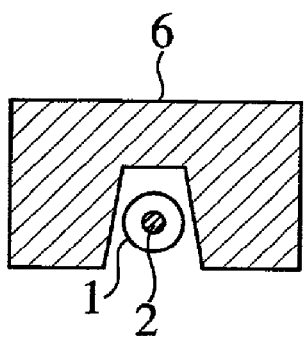
FIG. 2C is a variation of the strip-shaped member in which a groove is formed in trapezoidal.
Figure 2D:
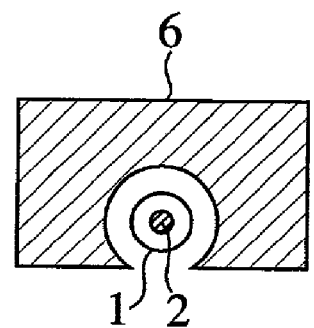
FIG. 2D is a variation of the strip-shaped member in which a groove is formed in circular.
Figure 2E:
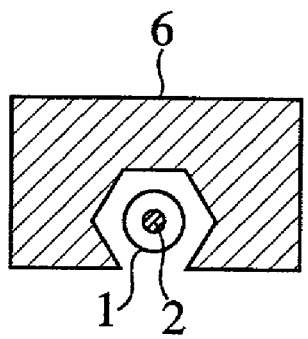
FIG. 2E is a variation of the strip-shaped member in which is a groove is formed in polygonal.

FIG. 2A is a variation of the strip-shaped member in which a groove is formed in U-shape. FIG. 2B is a variation of the strip-shaped member in which a groove is formed in rectangular. FIG. 2C is a variation of the strip-shaped member in which a groove is formed in trapezoidal. FIG. 2D is a variation of the strip-shaped member in which a groove is formed in circular. FIG. 2E is a variation of the strip-shaped member in which is a groove is formed in polygonal. As with the V-shaped groove shown in FIG. 1, the gel substance 7 is filled into a gap between the optical fiber 1 and the wall surface of the groove of the strip-shaped member 6.

As an exemplary material of the strip-shaped member 6, it is used clear and low temperature conductivity quartz. Clearness is essential for positioning the grating 2 with respect to the heater 3, and low temperature conductivity for not dispersing a heat produced from the heater 3 other than the grating 2. Here, the quartz is used, but the other materials excepting the quartz may be used unless they satisfy these conditions.

Figure 3A:
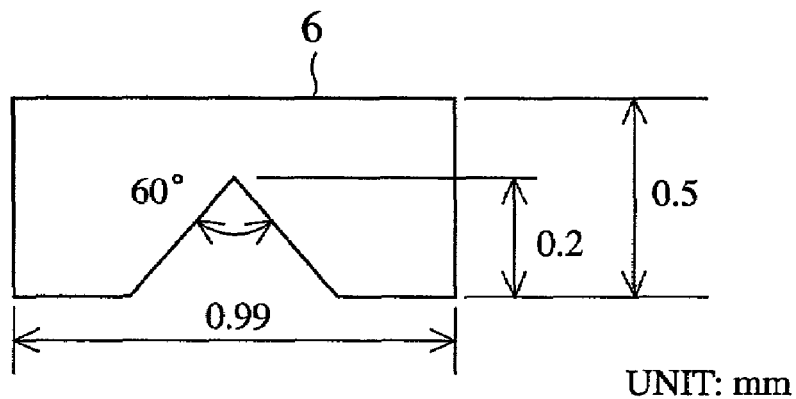
FIG. 3A is an example of the dimension of a groove of a strip-shaped member in V-shape.
Figure 3B:
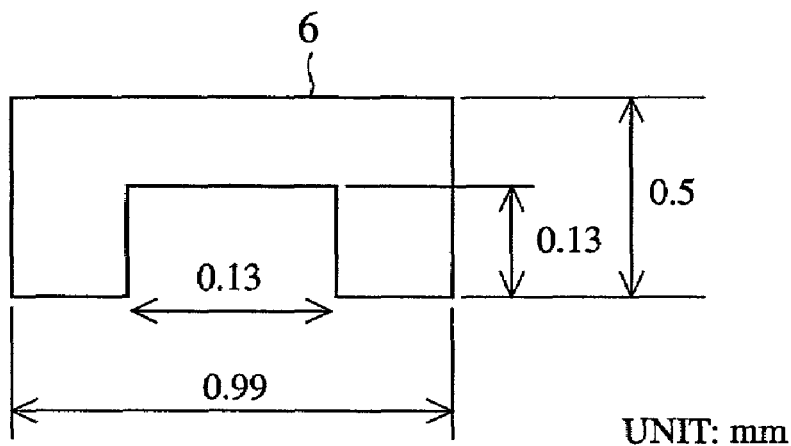

FIG. 3A is an example of the dimension of a groove of the strip-shaped member in V-shape. FIG, 3B is an example of the dimension of a groove of the strip-shaped member in rectangular. Requirements necessary for determining the dimensions of the groove of the strip-shaped member 6 involves not contacting the optical fiber 1 accommodated in the groove with the wall surface of the groove of the strip-shaped member 6, and having a moderate gap between the optical fiber 1 and the wall surface of the groove of the strip-shaped member 6.

It is because once the optical fiber 1 is contacted with the wall surface of the groove of the strip-shaped member 6, after a stress is applied, alleviation of the residual stress becomes low, and because gap between the optical fiber 1 and the wall surface of the gap of the strip-shaped member 6 is too large, the dead load of the filled gel substance 7 acts as a residual stress. This also affects the mounting position accuracy of the grating 2 and the heater 3 in the transverse direction.

As shown in FIGS. 1, 2, the optical fiber 1 is accommodated in the strip-shaped member 6 having formed thereon various grooves and the gel substance 7 is filled into the gap between the optical fiber 1 and the groove of the strip-shaped member 6. Then, the optical fiber 1 is mounted so that the grating 2 is positioned on the heater 3 and the strip-shaped member 6 is mounted on the substrate 4. In this way, linearity of the optical fiber 1 is secured, by accommodating the optical fiber 1 in the strip-shaped member 6, and by mounting it on the heater 3.

Next, the action of the gel substance 7 filled between the optical fiber 1 and the groove of the strip-shaped member 6 will be described.

Generally, the gel substance 7 is formed by chemically or physically combining mutually high polymer chains into a network and they are swelled to a fixed volume by absorbing solvents. The polymer chains are solidified to the extent that fluid that had fluidity earlier cannot collapse under the dead load. The hardness thereof is beyond measurements such as JIS standard and so on. It estimated using "penetration" for estimating the hardness by introducing a needle into the subject fluid so as to measure to what depth the needle is penetrated.

When the optical fiber 1 is mounted on the heater 3 using the strip-shaped member 6, the stress is resident over a part of or the entire the grating 2 of the optical fiber 1 whose whirl is corrected in order to forcibly accommodate the whirled optical fiber 1 in the rectilinear groove of the strip-shaped member 6. If nothing does exist in the groove between the optical fiber 1 and the strip-shaped member 6, the optical fiber 1 will become spatially free and the residual stress will be inevitably alleviated. To what extent can the stress be alleviated depends on how large the groove between the optical fiber 1 and the strip-shaped member 6 is. When there is nothing in the gap, the alleviation becomes large, but it becomes small, when the hardness is high as is the case of a rigid body, and the rigid body is connected to the optical fiber 1.

As a filler to be filled into the gap between the optical fiber 1 and the strip-shaped member 6, the conventional very hard adhesive is compared with the gel substance 7. It follows that the alleviation of the residual stress becomes small when the very hard adhesive is filled. On the contrary, when an adhesive like the gel substance 7 is soft and is not adhered but merely contacted, the alleviation will become small. Further, the adhesive 5 is adhered at an interface with the optical fiber 1, obstructing its motion caused in alleviating the stress on the optical fiber 1.

FIG. 4 is a flow chart showing assembly procedures of an optical fiber holding device according to a first embodiment.

At step ST 11, fill the gel substance 7 in the groove of the strip-shaped member 6 through a micro dispenser 6.

At step ST 12, accommodate the optical fiber 1 in the groove in which the gel substance 7 is filled. At this moment, a positioning marker (not shown) placed on the surface of the optical fiber 1 at the both ends of the grating 2 must be coincided with the both ends of the strip-shaped member 6. This work may be done by using a position controllable mounting device or by manual. The linearity accuracy of the groove of the strip-shaped member 6 in the transverse direction is several μ, so that linearity of the grating 2 in the longitudinal direction is ensured at the time the optical fiber 1 is accommodated in the groove.

At step ST 13, mount the strip-shaped member 6 in which the optical fiber 1 is accommodated on the substrate 4.

FIG. 5 is an explanatory drawing of a state of mounting the strip-shaped member on the substrate.

As shown in FIG. 5, the optical fiber 1 is mounted on the heater 3 by mounting the strip-shaped member 6 on the substrate 4, with the strip-shaped member 6 placed on the positioning marker of the strip-shaped member 6 which is provided on the substrate 4.

At step ST 14, hold the strip-shaped member 6 mounted on the substrate 4 with a suction-type zig, move the strip-shaped member 6 on the substrate 4 with the zig, thereby carrying put an accurate positioning of the grating 2 with respect to the heater 3. This is done on the microscope. The grating 2 is fine-tuned, seeing through the strip-shaped member 6 made of quartz, with respect to the heater 3 in the longitudinal and the transverse directions by a unit from several 10 μm to several 100 μm.

As noted above, the adjustment of the positioning of the grating 2 with respect to the heater 3 is made by moving the strip-shaped member 6 on the substrate 4. For this reason, while the strip-shaped member 6 is moving, the optical fiber 1 is subjected to a stress from the wall surface of the groove of the strip-shaped member 6. However, because the gel substance 7 filled into the gap is soft, the stress is alleviated, which is generated during the adjustment of the positioning and applied from the wall surface of the groove of the strip-shaped member 6 to the optical fiber 1. Namely, the stress applied to the grating 2 provided in the optical fiber 1 is also alleviated. This provides a good polarization mode dispersion characteristic, without suffering from degradation of an optical characteristic, especially, a polarization mode dispersion characteristic.

Then, the result of a comparison between the case where the gel substance 7 is used as a filler, and the case where an adhesive is used as a conventional one will be described.

FIG. 6 is a chart showing types and features of fillers used for comparing the polarization mode dispersion characteristic.

In FIG. 6, silicon adhesives, silicon pastes, silicon gel substances, silicon ultraviolet curing-type adhesives (containing fillers), silicon ultraviolet curing-type adhesives (not containing fillers), epoxy two-part heat curing-type adhesives are used. Where the silicon includes silicon compounds and Tg shown in the features of FIG. 6 indicates a glass transition temperature.

FIG. 7 is a block diagram showing a method of measuring the polarization mode dispersion (PMD).

An optical fiber holding device as a target device 55 is assembled based on the assembly procedures shown in FIG. 14. The filler shown in FIG. 6 is being filled in the groove of the strip-shaped member 6. After having fine-tuned at step ST 14 in FIG. 4, the polarization mode dispersion is measured before curing of the filler. Subsequently, the filler is cured under the respective cure conditions shown in FIG. 5 to measure the polarization mode dispersion after curing of the filler.

In FIG. 7, a tunable LD (laser Diode) 51 emits an optical signal of a predetermined wavelength. A modulator 52 applies an intensity modulation to the optical signal of the predetermined wavelength within range from 300 MHz to 1 GHz. A polarization beam splitter 53 splits the optical signal of the predetermined wavelength into two orthogonal polarization optical signals A, B. An optical switch 54 switches the two polarization waves A, B and outputs them to the target device 55. The PD (Photo Diode) 56 monitors the strength of the two polarization optical signals A, B output from the target device 55 and observes a phase difference φA−φB as the polarization mode dispersion by a measuring instrument (not shown).

The wavelength of the optical signal output from the tunable LD 51 is swept from $\lambda 1$ to $\lambda n$ to obtain P1 to Pn of the PMD ranging from $\lambda 1$ to $\lambda n$ using the above method. Then, P1$n$ of the PMd over the whole wavelength is defined by a mean value from P1 to Pn as shown in the following formula (1)

$$P1n=(P1+P2+ \ldots +Pn)/n \quad (1)$$

FIG. 8 is a chart showing measuring conditions of the polarization mode dispersion.

In FIG. 8, ranges of wavelength, modulation frequency, and dispersion amount of the grating 2 are defined as shown in FIG. 8. Where the dispersion amount of the grating 2 is defined by a gradient of a group delay (PS: pico second) with respect to the wavelength $\lambda$ (nm) Further, as a PMD mean value, P1$n$ of the PMD within the transmission band shown in the above formula is adopted. The acceptable PMD mean value is less than 2 to 3 ps when the frequency is more than 10 GHz.

FIG. 9 is a chart showing the results of the PMD mean value of the respective fillers shown in FIG. 6 before and after curing.

As shown in FIG. 9, those which show high PMD mean value "before curing" are judged to be epoxy ultraviolet curing-type adhesives (not containing fillers) and epoxy two-part heat curing-type adhesives. It appears that the optical characteristic is degraded, at step ST 14 of the assembly procedure in FIG. 4, due to a failure in alleviation of the stress to the optical fiber 1, which is generated when the positioning of the grating 2 with respect to the heater 3 is tried by moving the strip-shaped member 6.

Also, as shown in FIG. 9, those whose PMD mean value show an increase "after curing" are judged to be silicon adhesives, silicon pastes, and epoxy ultraviolet curing-type adhesives (containing fillers). It seems that the optical characteristic is degraded due to an application of a stress to the optical fiber 1, resulting from the volume change of the respective fillers.

In addition, as shown in FIG. 9, only the silicon gel substance shows a low PHD mean value "before and after curing" and does not undergo a variation. In view of these facts, it can be concluded that, the use of the silicon gel substance alleviates not only the stress applied to the optical fiber 1 before curing, which is generated when the grating 2 is positioned with respect to the heater 3 by moving the strip-shaped member 6, but also the stress applied to the optical fiber 1 due to the volume change in curing the silicon gel substance.

This silicon gel substance is yielded at a process where a liquid silicon is transitioned into a solid. The hardness thereof is varied in various ways in accordance with solvents or chemical compounds. Here, TSE3052 and so on made of GE TOSHIBA silicon is used by way of example.

Even though, like the epoxy ultraviolet curing-type adhesives (not containing fillers) and the epoxy two-part heat curing-type adhesives, the PMD mean value after curing is low, if the PMD mean value before curing is high, they are not qualified as a filler for the reason that the stress applied to the grating 2 would still be resident.

As mentioned above, according to the first embodiment, the positioning of the grating 2 with respect to the heater 3 is facilitated, by filling the soft gel substance in the groove of the strip-shaped member 6, by accommodating the optical fiber 1 in the groove of the strip-shaped member 6, and by mounting the strip-shaped member 6 on the substrate 4 to put the heater 3 on the optical fiber 1. This prevents the polarization mode dispersion from being degraded without occurring dislocation.

In this first embodiment, as an optical fiber holding device, the optical fiber with the grating 2 is accommodated in the groove of the strip-shaped member 6. Alternatively, an optical fiber 1 without the grating 2 may be accommodated in the groove of the strip-shaped member 6. In this case, the optical fiber holding device takes a structure in which a portion to be positioned with respect to the substrate 4 of the optical fiber 1 is accommodated in the groove of the strip-shaped member 6, and the gel substance is filled in the groove of the strip-shaped member 6. Such a structure facilitates the positioning of the optical fiber 1 with respect to such optical elements as a laser diode, a photo diode, a lens, an isolator, and another optical fibers and so on, which are positioned with respect to the substrate 4.

Second Embodiment

The optical fiber holding device according to a second embodiment shares the same structure in the first embodiment shown in FIGS. 1, 2, excepting its assembly procedures.

FIG. 10 is a flow chart showing assembly procedures of the optical fiber holding device according to a second embodiment.

At step ST 21, previously secure the strip-shaped member 6 on the substrate 4 on which the heater 3 is mounted. To this end, as shown in FIG. 5, the strip-shaped member 6 is mounted on the substrate 4 to the positioning marker of the strip-shaped member 6 provided on the substrate 4.

At step ST 22, fill the gel substance 7 in the strip-shaped member 6 secured on the substrate 4. To this end, the gel substance 7 is supplied through the micro dispenser in which the gel substance 7 is filled from the one end of the strip-shaped member 6 in the longitudinal direction. The gel substance 7 is filled in the groove of the strip-shaped member 6 with the aide of surface tension of the gel substance 7 and osmoses toward the other end of the strip-shaped member 6 in the longitudinal direction. Provision of a suction pomp to the other end of the strip-shaped member 6 in the longitudinal direction contributes to shortening of time required for osmosis of the gel substance 7.

At step ST 23, manually insert and accommodate the optical fiber 1 in the groove of the strip-shaped member 6 in which the gel substance 7 is filled. To this end, the positioning marker of the grating 2 that is placed on the surface of the optical fiber at the both ends of the grating 2 must be coincided with the both ends of the strip-shaped member 6. The optical fiber 1 ensures its linearity in the longitudinal direction by placing it in parallel along the rectilinear groove. Further, in the course of insertion of the optical fiber 1, the stress load applied to the optical fiber 1 due to whirl thereof is reduced to a small extent with the gel substance 7.

At step ST 24, manually move the optical fiber 1 accommodate d in the strip-shaped member 6 and carry out an accurate positioning of the grating 2 with respect to the heater 3. This is done on the microscope. The grating 2 is fine-tuned, seeing through the strip-shaped member 6 made of quartz, with respect to the heater 3 in the longitudinal direction by a unit from several 10 µm to several 100 µm.

In this way, the positioning of the grating 2 with respect to the heater 3 is carried out by moving the optical fiber 1 within the groove of the strip-shaped member 6. For this reason, while moving the optical fiber 1, the optical fiber 1 is subjected to a stress from the wall surface of the groove of the strip-shaped member 6. However, since the gel substance 7 filled in the gap is soft, the stress generated during positioning and applied from the wall surface of the groove of the strip-shaped member 6 to the optical fiber 1 is alleviated. This provides a good polarization mode dispersion characteristic without suffering from degradation of an optical characteristic, especially, the polarization mode dispersion characteristic.

As mentioned above, according to the second embodiment, the positioning of the grating 2 with respect to the heater 3 is facilitated, by securing the strip-shaped member 6 on the substrate 4 on which the heater 3 is mounted, by filling the gel substance 7 in the groove of the strip-shaped member 6, and by accommodating the optical fiber 1 in the groove of the strip-shaped member 6. This prevents the polarization mode dispersion characteristic from being degraded without occurring dislocation of the grating 2 with respect to the heater 3.

In this second embodiment, as an optical fiber holding device, the grating 2 of the optical fiber 1 is accommodated in the groove of the strip-shaped member 6. Alternatively, as with the first embodiment, a positioning portion of the optical fiber 1 without the grating 2 may be accommodated in the groove of the strip-shaped member 6.

Third Embodiment

The optical fiber holding device according to a third embodiment shares the same structure in the second embodiment shown FIGS. 1, 2, excepting its assembly procedures.

FIG. 11 is a flow chart showing assembly procedures of the optical fiber holding device according to a third embodiment.

At step ST 31, mount the optical fiber 1 on the heater 3 in such a manner that the both ends of the heater 3 are put on the positioning marker of the grating 2 which is placed on the surface of the optical fiber 1 at the both ends of the grating 2. To this end, in order to linearly mount the optical fiber 1 on the heater 3, the optical fiber 1 at the both ends of the grating 2 is held with a holing mechanism and the holding mechanism is moved in the longitudinal direction with a driving system. Then, with a position detecting mechanism for a CCD image analysis, the both ends of the heater 3 are put on the positioning marker of the grating 2 which is placed on the surface of the optical fiber 1 at the both ends of the grating.

At step ST 32, coat the gel substance 7 to the optical fiber mounted on the heater 3. To this end, the gel substance 7 is applied through the micro dispenser. Dropping amounts of the gel substance 7, scan speed of the micro dispenser, the distance between a tip of the micro dispenser and a coating surface of the optical fiber 1 should be accurately controlled so as to maintain the width of the gel substance 7 to be coated and the thickness thereof in the vertical direction at predetermined ones.

At step ST 33, mount the strip-shaped member 6 on the optical fiber 1 on which the gel substance 7 is coated and forcibly accommodate the optical fiber 1 in the groove of the strip-shaped member 6.

FIG. 12A shows a state in which dislocation of the grating with respect to the heater is occurred. FIG. 12B is an explanatory drawing of assembly procedures of the optical fiber holding device.

As shown in FIG. 12A, even if the optical fiber 1 is mounted on the heater 3 on the straight as can as possible, dislocation of the grating 2 with respect to the heater 3 will probably be occurred by a unit from several 10μ to several 100μ. In this state, as shown in FIG. 12B, the strip-shaped member 6 is put on the positioning marker of the strip-shaped member 6 which is placed on the substrate 4, the strip-shaped member 6 is fitted to the optical fiber 1 in a covering manner from the higher part, and the optical fiber 1 is forcibly accommodated in the groove of the strip-shaped member 6. This ensures linearity of the grating 2 in the longitudinal direction.

In this way, when the strip-shaped member 6 is mounted on the optical fiber 1 on which the gel substance 7 is coated, the mounting thereof has to be started, with the strip-shaped member 6 held with the suction-type zig and while holding it on the slant with respect to the optical fiber 1. When one end of the strip-shaped member 6 is contacted with the gel substance 7 coated on the optical fiber 1, the substrate 4 and the groove of the strip-shaped member 6 begin to be wet with the gel substance 7. From this state, gradually narrowing an angle of the strip-shaped member 6, the strip-shaped member 6 becomes finally parallel with the optical fiber 1 so as to be wet the other end of the strip-shaped member 6 with the gel substance 7. In this manner, by mounting the strip-shaped member 6 on the optical fiber 1, with the strip-shaped member 6 slanted to gradually narrow the angle air valve is prevented from entering in the groove of the strip-shaped member 6.

At step ST 34 in FIG. 11, hold the strip-shaped member 6 mounted on the optical fiber 1 with the zig and move it on the substrate 4 with the zig for accurately positioning the grating 2 with respect to the heater 3. This is done on the microscope. The heater 3 is fine-tuned, seeing through the strip-shaped member 6 made of clear quartz, in the longitudinal and transverse directions by a unit from several 10 μm to several 100 μm.

In this way, the adjustment of the positioning of the grating 2 with respect to the heater 3 is carried out by moving the strip-shaped member 6 on the substrate 4. For this reason, while the strip-shaped member 6 is moving, the optical fiber 1 is subjected to a stress from the wall surface of the groove of the strip-shaped member 6. However, since the gel substance 7 filled in the gap is soft, the stress generated during positioning and applied from the wall surface of the groove of the strip-shaped member 6 to the optical fiber 1 is alleviated. This provides a good polarization mode dispersion characteristic without suffering from degradation of an optical characteristic, especially, polarization mode dispersion.

As mentioned above, according to the third embodiment, the positioning of the grating 2 with respect to the heater 3 is facilitated, by mounting the optical fiber 1 on the heater 3, by coating the soft gel substance 7 on the optical fiber 1, and by mounting the strip-shaped member 6 on the substrate 4 to accommodate the optical fiber 1 in the groove of the strip-shaped member 6. This prevents the polarization mode dispersion from being degraded without occurring dislocation of the grating 2 with respect to the heater 3.

In this third embodiment, as an optical fiber holding device, the grating 2 of the optical fiber 1 is accommodated in the groove of the strip-shaped member 6. Alternatively, as with the first embodiment, a positioning portion of the optical fiber 1 without the grating 2 may be accommodated in the groove of the strip-shaped member 6.

Fourth Embodiment

FIG. 13 is a structural drawing of an optical dispersion-equalizer according to a fourth embodiment.

Referring to FIG. 13, reference numeral 11 denotes a Peltier element for holding a predetermined temperature level of the temperature distribution by heating the grating 2 through the substrate 4 to a predetermined one; 12 a temperature sensor for detecting a temperature at the grating 2 of the optical fiber 1; and 21 an optical fiber holding device comprising the grating 2, the heater 3, the substrate 4, the strip-shaped member 6, the gel substance 7 as with those of the first embodiment shown in FIG. 1, a newly added Peltier element 11, and a temperature sensor 12.

Again, referring to FIG. 13, reference numeral 22 denotes a Peltier element control circuit for controlling the Peltier element 11 based on the detected temperature by the temperature sensor 12; 23 a heater control circuit for controlling temperature of the heater 3; and 24 an optical circulator which is disposed on a line of an optical signal input to or output from the optical fiber 1 to the grating 2, for inputting an optical signal propagating through the optical fiber 1, and for outputting the optical signal reflected from the grating 2. As shown in FIG. 13, the optical dispersion-equalizer comprises the optical fiber holding device 21, the Peltier element control circuit 22, the heater control circuit 23, and the optical circulator 24.

The optical fiber holding device 21 follows the same assembly procedures as the above embodiments. The positioning of the grating 2 with respect to the heater 3 is facilitated, by accommodating the optical fiber 12 in the groove of the strip-shaped member 6, and by filling the gel substance 7 in the groove of the strip-shaped member 6. This prevents the polarization mode dispersion from being degraded without occurring dislocation of the grating 2 with respect to the heater 3.

Next, the operation of the fourth embodiment will be described.

The Peltier element control circuit 22 controls the Peltier element 11 based on the detected temperature and keeps the temperature level of the temperature distribution of the grating 2 at a predetermined one. In this embodiment, the temperature sensor 12 is arranged to be able to detect the temperature level in the vicinity of the center of the grating 2 in the longitudinal direction. The Peltier element control circuit 22 controls the Peltier element 11 such that the temperature detected by the temperature sensor 12 comes to the same as the center temperature of the temperature distribution. In this manner, by controlling the temperature of the heater 3 and the Peltier element 11, the temperature to be applied to the grating 2 for compensating the dispersion of the optical signal is stabilized to the desired one. The optical signal inputted by the optical circulator 24 is input to the optical fiber holding device 21, reflected by the grating 2, and outputted from the optical circulator 24.

As mentioned above, according to the fourth embodiment, the positioning of the grating 2 with respect to the heater 3 is facilitated, by accommodating the optical fiber 1 in the groove of the strip-shaped member 6 in which the gel substance 7 is filled, and by making the optical dispersion-equalizer using the optical fiber holding device 21 in which grating 2 is mounted on the heater 3. This prevents the polarization mode dispersion from being degraded without occurring dislocation of the grating 2 with respect to the heater 3.

According to the invention, it facilitates the positioning of the optical fiber with respect to a predetermined position. Thus, the invention prevents the polarization mode dispersion from being degraded without occurring dislocation of the optical fiber from the predetermined position.

According to the invention, it facilitates the positioning of the grating with respect to the heater. Thus, the invention prevents the polarization mode dispersion from being degraded without occurring dislocation of the gating from the heater.

While, in the preferred embodiments of the invention, the optical fiber holding device, the optical dispersion-equalizer, and the method of manufacturing the optical fiber holding device are give as an example, it should be understood by those skilled in the art that various modifications and changes may be made without departing from the spirit and scope of the invention.

Also, it should be noted that the invention meets all the objects mentioned above and also has the advantages of wide commercial utility, and that the invention has been set forth for purposes of illustration only and not of limitation. That is, the invention is limited only by the following claims which follow. Consequently, reference should be made to the following claims in determining the full scope of the invention.

What is claimed is:

1. An optical fiber holding device, comprising:
    an optical fiber having a grating;
    a strip-shaped member, having a rectilinear groove in which the optical fiber is accommodated, a gap formed between a wall surface of the rectilinear groove and the optical fiber, and a gel substance, which remains soft, contacting with the optical fiber and filled in the gap; and
    a substrate on which the optical fiber and the strip-shaped member are mounted, wherein a first positioning mark is provided on the substrate and a second positioning mark is provided on the optical fiber, so that the grating is positioned on the substrate by using the first and second positioning marks.

2. An optical fiber holding device according to claim 1, wherein the optical fiber is not contacted with a wall surface of the groove of the strip-shaped member.

3. An optical fiber holding device according to claim 1, wherein the gel substance includes a silicon compound.

4. An optical fiber holding device according to claim 1, wherein the strip-shaped member is made of quartz.

5. An optical fiber holding device, comprising:
    an optical fiber having a grating;
    a heater for heating the grating to a predetermined temperature distribution;
    a strip-shaped member, having a rectilinear groove in which the optical fiber is accommodated, a gap formed between a wall surface of the rectilinear groove and the optical fiber, and a gel substance, which remains soft, contacting with the optical fiber and filled in the gap; and
    a substrate on which the heater and the strip-shaped member are mounted, wherein a first positioning mark is provided on the substrate and a second positioning mark is provided on the optical fiber, so that the grating is positioned with respect to the heater by using the first and second positioning marks.

6. An optical fiber holding device according to claim 5, wherein the optical fiber is not contacted with a wall surface of the groove of the strip-shaped member.

7. An optical fiber holding device according to claim 5, wherein the optical fiber is contacted with the heater.

8. An optical fiber holding device according to claim 5, further comprising:
    a Peltier element for keeping a temperature level of the predetermined temperature distribution of the grating at a predetermined level; and
    a temperature sensor for detecting the temperature of the optical fiber used to control the Peltier element.

9. An optical fiber holding device according to claim 5, wherein the gel substance includes a silicon compound.

10. An optical fiber holding device according to claim 5, wherein the strip-shaped member is made of quartz.

11. An optical dispersion-equalizer, comprising:
    an optical fiber having a grating;
    a heater for heating the grating to a predetermined temperature distribution;
    a heater control circuit for controlling a temperature of the heater;
    a strip-shaped member, having a rectilinear groove in which the optical fiber is accommodated, a gap formed between a wall surface of the rectilinear groove and the optical fiber, and a gel substance, which remains soft, contacting with the optical fiber and filled in the gap;
    a substrate on which the heater and the strip-shaped member are mounted, wherein a first positioning mark is provided on the substrate and a second positioning mark is provided on the optical fiber, so that the grating is positioned with respect to the heater by using the first and second positioning marks;
    a Peltier element for keeping temperature level of the predetermined temperature distribution of the grating at a predetermined level;
    a temperature sensor for detecting the temperature of the optical fiber;
    a Peltier element control circuit for controlling the peltier element based on the temperature of the optical fiber detected by the temperature sensor; and
    an optical circuitry for inputting an optical signal to the grating and for outputting the optical signal reflected on the grating.

12. A method of manufacturing an optical fiber holding device comprising an optical fiber having a grating; a heater for heating the grating to a predetermined temperature distribution; a strip-shaped member, having a rectilinear groove in which the optical fiber is accommodated, and a gel substance contacting with the optical fiber is filled; and a substrate on which the heater and the strip-shaped member are mounted, said method comprising the steps of filling the gel substance in the groove of the strip-shaped member;

accommodating the optical fiber in the groove of the strip-shaped member in which the gel substance is filled;

mounting the strip-shaped member, in which the gel substance is filled and the optical fiber is accommodated, on the substrate on which the heater is mounted; and moving the strip-shaped member on the substrate so as to carry out a positioning of the groove with respect to the heater.

13. A method of manufacturing an optical fiber holding device comprising an optical fiber having a grating; a heater for heating the grating to a predetermined temperature distribution; a strip-shaped member, having a rectilinear groove in which the optical fiber is accommodated, and a gel substance contacting with the optical fiber is filled; and a substrate on which the heater and the strip-shaped member are mounted; said method comprising the steps of securing the strip-shaped member on the substrate on which the heater is mounted;

filling the gel substance in the groove of the strip-shaped member secured on the substrate;

inserting and accommodating the optical fiber in the groove of the strip-shaped member in which the gel substance is filled; and moving the optical fiber on the heater so as to carry out a positioning of the grating with respect to the heater.

14. A method of manufacturing an optical fiber holding device comprising an optical fiber having a grating; a heater for heating the grating to a predetermined temperature distribution; a strip-shaped member, having a rectilinear groove in which the optical fiber is accommodated, and a gel substance is filled; and a substrate on which the heater and the strip-shaped member are mounted, said method comprising the steps of mounting the optical fiber on the heater which is mounted on the substrate;

coating the optical fiber mounted on the heater with a gel substance;

mounting the strip-shaped member on the substrate and accommodating the optical fiber in the groove of the strip-shaped member; and moving the strip-shaped member on the substrate so as to carry out a positioning of the grating with respect to the heater.

* * * * *